UNITED STATES PATENT OFFICE.

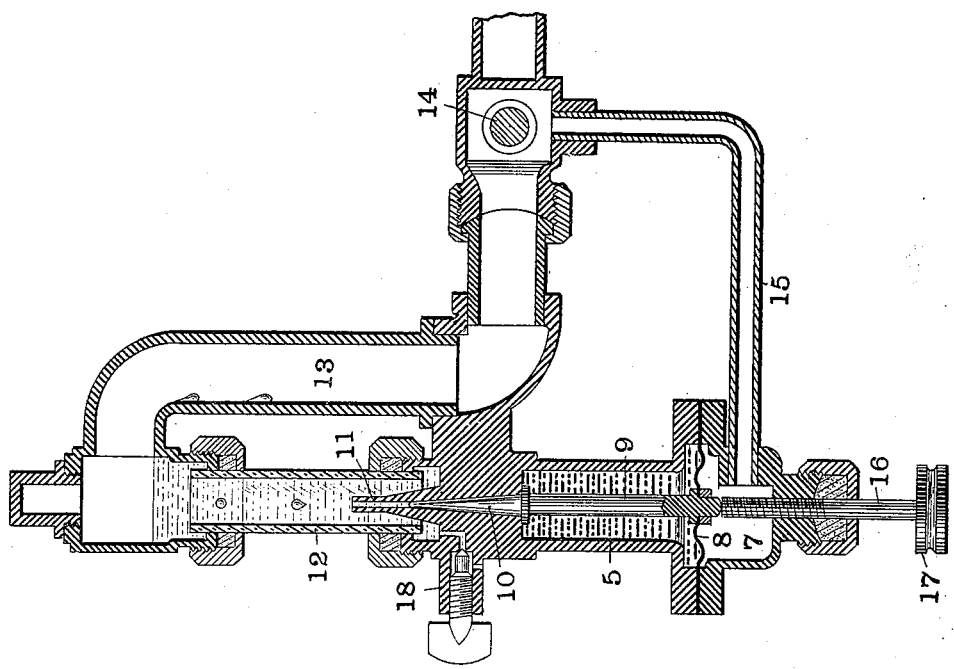
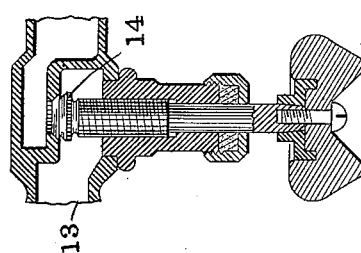
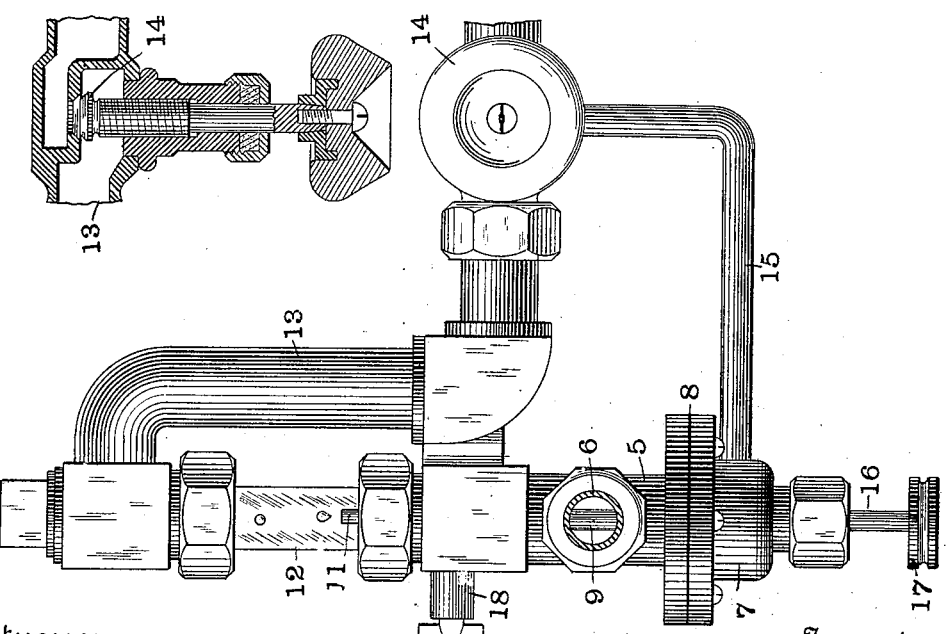

FREDERIC W. BITTMAN, OF ST. LOUIS, MISSOURI.

CYLINDER-LUBRICATOR.

SPECIFICATION forming part of Letters Patent No. 659,639, dated October 16, 1900.

Application filed March 30, 1898. Serial No. 675,651. (No model.)

*To all whom it may concern:*

Be it known that I, FREDERIC W. BITTMAN, a citizen of the United States, residing at St. Louis, in the State of Missouri, have invented a certain new and useful Cylinder-Lubricator, of which the following is such a full, clear, and exact description as will enable any one skilled in the art to which it appertains to make and use the same, reference being had to the accompanying drawings, forming part of this specification.

My invention relates to a cylinder-lubricator for steam-engines, and more particularly to a lubricator in which the lubricant is fed to the cylinder under pressure.

The object of my invention is to provide a lubricator in which the outlet-passage for the oil will be automatically closed whenever the pressure upon the oil falls below the steam-pressure, and thus prevent water and steam from entering the oil-compartment.

My invention consists in a cylinder-lubricator having a valve in the outlet-passage for the oil, which valve is impelled to open said passage by the pressure of the oil and to close said passage by the pressure of the steam, whereby the opening and closing of the outlet-passage will be automatically regulated by the relative pressure of the steam and oil.

In the accompanying drawings, which illustrate one form of lubricator made in accordance with my invention, Figure 1 is a side elevation. Fig. 2 is a section through the cut-off valve, and Fig. 3 is a vertical section.

Like marks of reference refer to similar parts in the several views of the drawings.

5 is the oil-chamber, into which the oil is forced by a pump or other suitable means through an inlet-pipe 6.

7 is a steam-pressure chamber which is separated from the oil-chamber 5 by a diaphragm 8. Projecting through and secured to the diaphragm 8 is a stem 9, carrying a conical valve 10, which is adapted to close the outlet-passage 11, through which the oil escapes into the sight-feed glass 12. Leading from the sight-feed glass 12 to the steam-pipe supplying steam to the cylinder to be lubricated is a pipe 13, which is preferably supplied with a suitable cut-off valve, such as the valve 14. Leading from the pipe 13 to the steam-pressure chamber 7 is a passage 15. Entering the chamber 7 and adapted to come in contact with the end of the stem 9 is a threaded rod 16, which is provided with a milled head 17. By adjusting the rod 16 the distance which the valve 10 can be opened by the action of the diaphragm may be regulated. This rod can also be used to manually close the valve 10 when for any reason it is desired to cut off the steam from the device by the cut-off valve 14, and thus prevent the filling of the steam-pipe connection 13 with oil, which would take place if this was not done. The sight-feed glass 12 is connected with a vent 18, through which the water may be blown off.

The operation of my lubricator is as follows: The oil is fed into the chamber 5 through the pipe 6 under pressure by a pump or any other suitable means. The pressure of the oil acting on the upper face of the diaphragm 8 tends to force it downward, and thus unseat the valve 10 and allow the oil to escape through the outlet 11 into the sight-feed glass 12. The steam-pressure on the lower surface of the diaphragm tends to force it upward, and thus cause the valve 10 to close the outlet 11. It will be readily seen from the above that as long as the oil-pressure is greater than the steam-pressure the valve 10 will be kept unseated, and so allow the escape of the oil through the outlet 11; but as soon as the oil-pressure falls below the steam-pressure the valve 10 will be seated and close the outlet 11, so that the water and steam cannot enter the oil-chamber. The area of valve 10 which is subject to steam pressure is so small in comparison with the area of the diaphragm 8 that the pressure exerted on it tending to unseat the valve has practically no effect on the operation of the lubricator.

In a lubricator constructed in accordance with the accompanying drawings the steam-pressure chamber and the passage 15 may become filled with water by the condensation of steam in the steam-pipe connection; but this will not affect the action of the device, as the steam-pressure will be communicated to the diaphragm through the water as effectively as if the passage and chamber were filled with steam.

Having fully described my invention, what I claim as new, and desire to secure by Letters Patent of the United States, is—

1. In a cylinder-lubricator, a sight-feed glass, an oil-chamber, means for feeding the oil to said chamber under pressure, a passage leading from said oil-chamber and discharging into the lower end of said sight-feed glass, a valve in said passage, a steam-pressure chamber, and a movable member between said steam-pressure and oil chambers for controlling said valve, said movable member being acted upon on one side by the steam-pressure and on the other side by the oil-pressure.

2. In a cylinder-lubricator, a suitable oil-chamber into which oil is fed under pressure, an outlet-passage for the oil, a suitable valve for said outlet-passage, a steam-pressure chamber, and a movable member between said steam-pressure and oil chambers and connected to said valve, and acted upon in opposing directions by the oil and steam pressure whereby the opening and closing of said outlet-passage will be automatically regulated by the relative pressure of the steam and oil.

3. In a cylinder-lubricator, a suitable oil-chamber into which oil is fed under pressure, an outlet-passage for the oil, a suitable valve for said outlet-passage, a steam-pressure chamber, and a diaphragm between said steam-pressure and oil chambers and connected to said valve and acted upon in opposing directions by the steam and oil pressure whereby the opening and closing of said outlet-passage will be automatically regulated by the relative pressure of the steam and oil.

4. In a cylinder-lubricator, an oil-chamber, means for feeding oil into said chamber under pressure, an outlet-passage discharging the oil into steam-pipe connections, a valve in said outlet-passage, a steam-pressure chamber, and a diaphragm between said steam-pressure and oil chambers and controlling said valve, said diaphragm being acted upon on one side by the steam-pressure and on the other side by the oil-pressure, and a passage connecting said steam-pressure chamber with said steam-pipe connections.

In testimony whereof I have hereunto set my hand and seal in the presence of the two subscribing witnesses.

FREDERIC W. BITTMAN. [L. S.]

Witnesses:
  A. C. FOWLER,
  W. A. ALEXANDER.